3,390,165
Patented June 25, 1968

3,390,165
PROCESS FOR THE PREPARATION OF MESOMERIC PHOSPHONIUM ESTER SALTS
Gail H. Birum, Kirkwood, and Clifford N. Matthews, St. Louis, Mo., assignors to Monsanto Company, St. Louis, Mo., a corporation of Delaware
No Drawing. Filed Mar. 30, 1966, Ser. No. 538,573
8 Claims. (Cl. 260—455)

This invention relates to a process for preparing ester salts containing mesomeric diphosphonium cation groups.

The mesomeric diphosphonium ester salts prepared by the process of this invention are represented by the formula

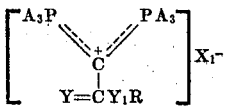

wherein each A is aryl, R is an organic radical of not more than 20 carbon atoms selected from the group consisting of alkyl, alkenyl and

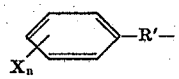

wherein R' is alkylene of 1 to 14 carbon atoms, X is halogen (Cl, Br, F and I) and $n$ is an integer from 0 to 5; $X_1$ is selected from the group consisting of Cl, Br and I, and Y and $Y_1$ are selected from the group consisting of oxygen and sulfur, provided that Y is oxygen when $Y_1$ is oxygen.

The process of this invention is carried out by reacting an adduct of hexaphenylcarbodiphosphorane selected from the group consisting of the formula

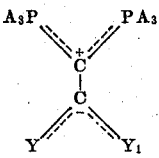

with an organic halide of the formula $RX_1$ wherein A, Y, $Y_1$, R and $X_1$ are as defined above. In carrying out the process of this invention the hexaphenylcarbodiphosphorane adduct and $RX_1$ compound can be added separately or concomitantly to the reaction vessel in equimolar amounts or an excess of either reactant can be used. If excess reactant is employed it is preferred that it be the $RX_1$ reactant since it will serve as reaction medium and is easily separated from the product. Temperature of reaction for the process of this invention is not critical and good results can generally be obtained from about 0° C. to 150° C. Temperatures from 20° C. to 100° C. are preferred.

The process is preferably carried out in the presence of an inert organic medium. The organic reaction medium which can be employed in the process of this invention can be any of the well-known solvents and diluents which are inert to the reactants, e.g. aromatic hydrocarbons such as benzene, toluene and xylene; ethers such as diethyl ether, dibutyl ether, bis(2-methoxyethyl) ether and tetrahydrofuran; cyclic hydrocarbons such as cyclohexane; nitriles such as acetonitrile; and amides such as dimethylacetamide.

The separation of the desired mesomeric diphosphonium compounds from the reaction mixture is readily accomplished by conventional means well known in the art, e.g. filtration, fractional distillation under reduced pressure, selective extraction, fractional distillation using a carrier gas, film distillation, elution or any suitable combination of these methods.

Representative R organic radicals for the compounds of the above formulae prepared by the process of this invention include by way of example alkyl such as methyl, ethyl, n-propyl, isopropyl, n-butyl, sec-butyl, isobutyl, tert-butyl, amyl, hexyl, heptyl, octyl, nonyl, decyl, dodecyl, tetradecyl, hexadecyl, octadecyl and the various homologues and isomers of alkyl having from 1 to 20 carbon atoms, alkenyl such as vinyl, allyl, n-butenyl-1, n-butenyl-2, n-pentenyl-2, n-hexenyl-2, 2,3-dimethylbutenyl-2, n-heptenyl, n-decenyl, n-dodecenyl and the various homologues and isomers of alkenyl having 2 to 20 carbon atoms, aralkyl (7 to 20 carbon atoms) such as benzyl, phenylethyl, diphenylmethyl and the like, and haloaralkyl (7 to 20 carbon atoms) such as chlorobenzyl, bromobenzyl, chlorophenylethyl, 2,4-dichlorophenylethyl, 2,4,6-trichlorophenylmethyl, bromophenylethyl, fluorophenylethyl, iodobenzyl and the like. When R is the formula

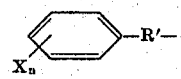

R' is alkylene, including straight and branched chain, having from 1 to 14 carbon atoms. Preferably R' has from 1 to 6 carbon atoms. When R is alkyl or alkenyl the number of carbon atoms is preferably not more than 12. Representative A aryl for the above formula include for example phenyl, biphenyl, naphthyl and the like.

The mesomeric phosphonium salts of this invention and processes for making them are disclosed and claimed in copending application Ser. No. 543,765, filed Mar. 30, 1966. For the sake of brevity and simplicity the salts of the above formula will sometimes be represented hereinafter by

The mesomeric diphosphonium salts prepared by the process of this invention can be used as pest controlling agents, textile auxiliaries, means for soil amelioration, disinfectants (fungicides and bactericides), detergents, additives for petroleum products and means for flameproofing polymers, ion exchanges and the like.

The following examples further illustrate the invention. Parts and percent are by weight unless otherwise indicated.

Example 1

This example describes the preparation of

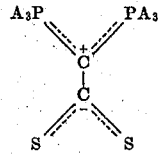

wherein each A represents phenyl.

To a mixture of 11.3 parts of hexaphenylcarbodiphosphorane and 42 parts of dimethylacetamide under stirring is added 8 parts of carbon disulfide. The reaction mixture is heated to about 55° C. for about 30 minutes, stirred while cooling to room temperature and filtered under nitrogen. The solid is washed with dimethylacetamide and with ethyl ether and dried for 16 hours at 60°/0.1 mm. to give a bright yellow powder which changes to light tan and partially melts at 129–130°, the remainder gradually melting up to about 188°.

*Analysis.*—Calcd. for $C_{38}H_{30}P_2S_2$: C, 74.49; H, 4.94; P, 10.11; S, 10.46. Found: C, 73.90; H, 5.05; P, 9.99; S, 10.36.

Example 2

This example describes the preparation of

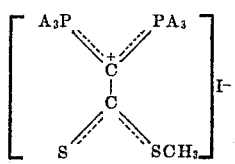

wherein each A represents phenyl.

To a suspension of 3.3 parts of the product of Example 1 above in 10 g. of dimethylacetamide under stirring at room temperature is added 5.5 parts of methyl iodide. The reaction mixture is stirred for 2 hours, filtered, and the solid washed with dimethylacetamide and with ethyl ether and dried at 60°/0.1 mm. for 2 hours to give 1.8 parts (0.6 part more separated from the filtrate), of a yellow solid, M.P. 152–152.5° (dec.). The infrared and NMR ($H^1$ and $P^{31}$) spectra are consistent with the assigned structure.

*Analysis.*—Calcd. for $C_{39}H_{33}IP_2S_2$: C, 62.06; H, 4.41; I−, 16.81; P, 8.21; S, 8.50. Found: C, 61.89; H, 4.26; I−, 17.06; P, 8.09; S, 8.74.

Example 3

This example describes the preparation of

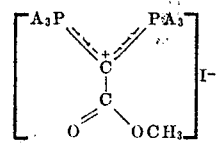

wherein each A represents phenyl.

A reaction vessel equipped with a gas delivery tube is purged with nitrogen and charged with 5.4 parts of hexaphenylcarbodiphophorane and 40 parts of dimethylacetamide. This mixture is stirred as gaseous carbon dioxide and nitrogen are introduced below the liquid surface for about 2 hours. Methyl iodide, 10 parts, is then added to the reaction mixture. Eethyl ether is then added to precipitate a white solid which is separated after 30 minutes by filtration, washed with ethyl ether and dried for 12 hours at 80°/0.1 mm. to give 6.1 parts (85%) of the above salt, M.P. 218–219°. The infrared and NMR (H' and $P^{31}$) spectra are consistent with the assigned structure.

*Analysis.*—Calcd. for $C_{39}H_{33}IO_2P_2$: C, 64.83; H, 4.60; I−, 17.56; P, 8.58. Found: C, 64.89; H, 4.60; I−, 17.60; P, 8.49.

Example 4

This example describes the preparation of

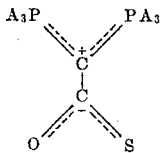

wherein each A represents phenyl.

A reaction vessel equipped with a gas delivery tube extending below the liquid surface is charged with 5.4 parts hexaphenylcarbodiphosphorane and 50 parts diglyme. The mixture is stirred as a stream of carbonyl sulfide (COS) and nitrogen is passed into the vessel. The reaction mixture is warmed to about 100° C. and then allowed to cool to room temperature as treatment with COS is continued. The reaction mixture is then filtered, and the solid residue washed with diglyme and with ethyl ether and dried for 2 hours at 90°/0.05 mm. to give 4.9 parts (82%) of an off-white powder, M.P. 152–155° (dec.), $P^{31}$ NMR spectrum (single peak at −18.8 p.p.m.).

*Analysis.*—Calcd. for $C_{38}H_{30}OP_2S$: C, 76.49; H, 5.07; P, 10.38; S, 5.37. Found: C, 76.50; H, 5.40; P, 10.15; S, 5.15.

Example 5

This example describes the preparation of

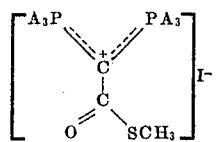

wherein each A represents phenyl.

A reaction vessel equipped with a gas delivery tube extending below the liquid surface is charged with 5.4 parts hexaphenylcarbodiphosphorane and 25 parts dimethylacetamide. The mixture is stirred and warmed to 60° C. as a stream of gaseous carbonyl sulfide and nitrogen is passed into the vessel for about 18 minutes. Stirring and nitrogen addition are continued for about 30 minutes more and then 7.1 parts of methyl iodide are added rapidly. Stirring is continued for about 30 minutes and then ethyl ether is added slowly, causing a white solid to precipitate. The solid is separated by filtration, washed with ethyl ether and dried for sixteen hours at 90°/3 mm. to give 5.6 parts of white solid. One-half of this product is admixed with warm methanol and enough acetonitrile is added to give a clear solution. This solution is cooled, filtered and the solid is washed with methanol and with ether and dried for sixteen hours at 90°/3 mm. to give 1.7 parts of white solid, M.P. 218–219.5° (dec.); $P^{31}$ NMR chemical shift, −19.3 p.p.m.; H'NMR, (aryl region centered at −7.67 p.p.m. and methyl at −1.97 p.p.m. in the theoretical 10:1 area ratio).

*Analysis.*—Calcd. for $C_{39}H_{33}IOSP_2$: C, 63.42; H, 4.50; I−, 17.18; P, 8.39; S, 4.34. Found: C, 63.94; H, 4.62; I−, 17.23; P, 8.34; S, 4.36.

The infrared spectrum is also consistent with the above assigned structure.

Examples 6 to 25

Examples 6 to 25 describe the peraparation of mesomeric diphosphonium ester salts of the formula

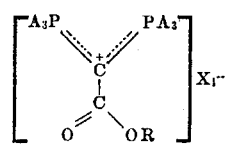

wherein each A is phenyl and R and $X_1$ are as given in Table I, by reacting the adduct of hexaphenylcarbodiphosphorane and $CO_2$ with the appropriate organic halide ($RX_1$) compound. Reaction conditions and purification procedures similar to those employed in Example 2 are used in Examples 6 to 25. Results and further details are given below.

TABLE I

| Example No. | Product Salt | |
|---|---|---|
| | R | $X_1$ |
| 6 | Ethyl | Cl |
| 7 | Propyl | I |
| 8 | Butyl | Cl |
| 9 | Amyl | Cl |
| 10 | Hexyl | I |
| 11 | Decyl | Br |
| 12 | Hexadecyl | Br |
| 13 | Octadecyl | Cl |
| 14 | Benzyl | Cl |
| 15 | Phenylethyl | Br |
| 16 | Chlorophenylethyl | I |
| 17 | Chlorobenzoyl | I |
| 18 | Bromobenzyl | I |
| 19 | Allyl | I |
| 20 | 2-propenyl | Cl |
| 21 | 2-butenyl | Cl |
| 22 | 2-pentenyl | Cl |
| 23 | 3-pentenyl | Cl |
| 24 | 2-octenyl | Cl |
| 25 | 2-methyl-3-pentenyl | Br |

Having thus described our invention, what we desire to claim and secure by Letters Patent is:

1. Process for the preparation of compounds as represented by the formula

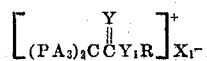

wherein A is phenyl, $X_1$ is selected from the group consisting of Cl, Br and I, R is an organic radical of not more than 20 carbon atoms selected from the group consisting of alkyl, alkenyl and

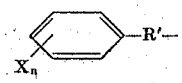

wherein R' is alkylene, X halogen, and $n$ is an integer from 0 to 5, and Y and $Y_1$ are selected from the group consisting of oxygen and sulfur, provided that Y is oxygen when $Y_1$ is oxygen, which comprises reacting an adduct of hexaphenylcarbodiphosphorane selected from the group consisting of adducts of the formula

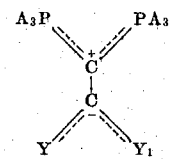

with an organic halide of the formula $RX_1$ wherein A, R, Y, $X_1$ and $Y_1$ are as defined above and when $Y_1$ is oxygen, Y is oxygen.

2. Process of claim 1 wherein the adduct is hexaphenylcarbodiphosphorane and carbon dioxide.

3. Process of claim 1 wherein the adduct is hexaphenylcarbodiphosphorane and carbon disulfide.

4. Process of claim 1 wherein the adduct is hexaphenylcarbodiphosphorane and COS.

5. Process of claim 1 wherein the organic halide is an alkenyl halide.

6. Process of claim 1 wherein the organic halide is an alkyl halide.

7. Process of claim 1 wherein the organic halide is haloaralkyl halide.

8. Process of claim 1 wherein the organic halide is methyl iodide.

References Cited

Birum et al.: "J.A.C.S.," vol. 88, pp. 4198–4203 (1966).

CHARLES B. PARKER, *Primary Examiner.*

D. R. PHILLIPS, *Assistant Examiner.*